(12) United States Patent
Hoobler et al.

(10) Patent No.: US 12,498,440 B1
(45) Date of Patent: Dec. 16, 2025

(54) BARCODE-READING SYSTEM THAT UTILIZES BEACON MESSAGES TO COMMUNICATE INFORMATION ABOUT BARCODE-READING DEVICES

(71) Applicant: The Code Corporation, Murray, UT (US)

(72) Inventors: Ryan Wayne Hoobler, Cottonwood Heights, UT (US); Steven Ned Pierce, West Jordan, UT (US)

(73) Assignee: The Code Corporation, Murray, UT (US)

( * ) Notice: Subject to any disclaimer, the term of this patent is extended or adjusted under 35 U.S.C. 154(b) by 520 days.

(21) Appl. No.: 18/052,498

(22) Filed: Nov. 3, 2022

(51) Int. Cl.
  *G01S 1/04* (2006.01)
  *G01S 1/08* (2006.01)
(52) U.S. Cl.
  CPC ............. *G01S 1/042* (2013.01); *G01S 1/047* (2013.01); *G01S 1/08* (2013.01)
(58) Field of Classification Search
  CPC ............ G01S 1/042; G01S 1/047; G01S 1/08
  USPC ............................ 342/386, 146, 52, 465, 432
  See application file for complete search history.

(56) References Cited

U.S. PATENT DOCUMENTS 10,715,974 B2   7/2020   Todeschini
2018/0007544 A1*  1/2018   Grassel .................. H04W 4/50

\* cited by examiner

*Primary Examiner* — Bo Fan
(74) *Attorney, Agent, or Firm* — Thomas M. Hardman

(57) ABSTRACT

A barcode-reading device can be configured to transmit a beacon message under certain circumstances in which the barcode-reading device may be lost, or may be likely to become lost, such as when a barcode-reading device becomes unintentionally disconnected from a base station. Intermediary systems can be configured to periodically listen for beacon messages from barcode-reading devices. When an intermediary system receives a beacon message, the intermediary system can determine whether the beacon message was sent by a barcode-reading device. If it was, the intermediary system can forward the beacon message (or at least some of the contents of the beacon message) to a remote server. In response to receiving a forwarded beacon message, a remote server can generate and send a notification message to one or more recipients. The notification message can also include information that indicates (or is in some way related to) the location of the barcode-reading device.

20 Claims, 9 Drawing Sheets

BARCODE-READING SYSTEM THAT UTILIZES BEACON MESSAGES TO COMMUNICATE INFORMATION ABOUT BARCODE-READING DEVICES

CROSS-REFERENCE TO RELATED APPLICATIONS

N/A

BACKGROUND

The present disclosure is generally related to barcodes and barcode-reading devices. The term "barcode" refers to an optical machine-readable representation of information. The term "barcode-reading device" refers to any device that is capable of identifying or extracting information from barcodes. The process of identifying or extracting information from a barcode can be referred to as reading (or scanning) a barcode. When a barcode is successfully read (or scanned) by a barcode-reading device, the information that is identified or extracted from the barcode can be referred to as decoded data.

A barcode-reading device can be used with a base station. A base station may alternatively be referred to as a docking station, a charging station, or the like. In some implementations, a base station can be configured so that a barcode-reading device can be physically connected to (e.g., placed on or inside) the base station. Both the barcode-reading device and the base station can include charging contacts. When the barcode-reading device is physically connected to the base station, the barcode-reading device's charging contacts can be electrically coupled to the base station's charging contacts. While in this configuration, the base station can provide power to the barcode-reading device for charging the barcode-reading device's battery.

A barcode-reading device can be capable of wireless communication with a base station. Thus, even when the barcode-reading device is physically detached from the base station, the barcode-reading device can still be capable of communicating with the base station. Wireless communication between a barcode-reading device and a base station can occur via a short-range wireless communication protocol, such as Bluetooth.

Bluetooth has a feature that is known as "beacons." With the beacons feature of Bluetooth, a Bluetooth device can periodically broadcast a beacon message and any other Bluetooth device that is appropriately configured can receive the beacon message. A common use case for Bluetooth beacons involves digital coupons. When someone who has a store's application installed on his or her mobile device enters the store, the store can send that person information (e.g., coupons, information about a sale) by broadcasting Bluetooth beacon messages.

A paired connection can be established between a barcode-reading device and a base station. When a paired connection is established between a barcode-reading device and a base station, any decoded data that is generated by the barcode-reading device can be automatically sent to the base station.

When a barcode-reading device is going to be used to read barcodes, a paired connection can be formed between the barcode-reading device and a base station. When the barcode-reading device reads a barcode, the barcode-reading device can generate decoded data and wirelessly transmit the decoded data to the base station. The base station can then forward the decoded data to the host computing device.

There are many different things that the host computing device can do with the decoded data. For example, the decoded data can be provided to an application that is running on the host computing device. As another example, the host computing device can transmit the decoded data to one or more other computing devices that will process (or otherwise make use of) the decoded data.

From time to time, a barcode-reading device can become lost. There are many different reasons why this can happen. For example, in a hospital setting, a hospital employee can mistakenly put a barcode-reading device in his or her pocket and walk away from the place where the barcode-reading device is supposed to be. In an industrial setting, a factory worker can inadvertently place a barcode-reading device on a cart (or other vehicle) that inadvertently gets wheeled away from its typical location. In a retail setting, a customer can move a barcode-reading device and place it in a location that is difficult to find. Many other examples of ways that a barcode-reading device can become lost or misplaced will be readily apparent to those skilled in the art.

The subject matter in the background section is intended to provide an overview of the overall context for the subject matter disclosed herein. The subject matter discussed in the background section should not be assumed to be prior art merely as a result of its mention in the background section. Similarly, a problem mentioned in the background section or associated with the subject matter of the background section should not be assumed to have been previously recognized in the prior art.

SUMMARY

The systems and methods disclosed herein are generally related to communicating information about barcode-reading devices. As an example, the systems and methods disclosed herein can make it easier to find a lost or misplaced barcode-reading device. The systems and methods disclosed herein involve the use of beacon messages. In accordance with the present disclosure, a barcode-reading device can be configured to transmit a beacon message under certain circumstances in which the barcode-reading device may be lost, or may be likely to become lost, such as when a barcode-reading device becomes unintentionally disconnected from a base station.

In some embodiments, the beacon message that is transmitted by a barcode-reading device can be a Bluetooth beacon message. In other words, the sending and the receiving of the beacon message can occur in accordance with the beacon feature of the Bluetooth protocol.

A barcode-reading system in accordance with the present disclosure can include one or more intermediary systems. In this context, the term "intermediary system" can refer to any device or combination of devices that can receive a beacon message sent by a barcode-reading device and forward at least some of the contents of the beacon message to a remote server. Many different types of intermediary devices can be utilized in accordance with the techniques disclosed herein. For example, an intermediary system can include a base station that is communicatively coupled to a host computing device. As another example, an intermediary system can include a mobile device having an application that is configured to receive and forward beacon messages to a remote server.

Intermediary systems can be configured to periodically listen for beacon messages from barcode-reading devices. A beacon message can include certain information, such as a group identifier (ID), that enables the intermediary systems to recognize that the beacon message has been sent by a barcode-reading device. A beacon message can also include a barcode-reading device ID that uniquely identifies the barcode-reading device that sent the beacon message.

A beacon message sent by a barcode-reading device can be received by one or more intermediary systems. When an intermediary system receives a beacon message, the intermediary system can determine whether the beacon message was sent by a barcode-reading device (e.g., by determining whether the beacon message includes a particular group ID). If the intermediary system determines that the beacon message was sent by a barcode-reading device, the intermediary system can forward the beacon message (or at least some of the contents of the beacon message) to a remote server.

In response to receiving a forwarded beacon message from one or more intermediary systems, a remote server can generate and send a notification message to one or more recipients. In addition to identifying the barcode-reading device, the notification message can also include information that indicates (or is in some way related to) the location of the barcode-reading device. For example, the notification message can indicate that the barcode-reading device has been located in the vicinity of a particular intermediary system. Alternatively, or in addition, the notification message can specify the location of the barcode-reading device (e.g., in terms of global positioning system (GPS) coordinates).

Under some circumstances, a plurality of intermediary systems can receive a beacon message and forward the beacon message (or at least some of the contents of the beacon message) to a remote server. When this happens, the remote server can select which intermediary system should be referenced in the notification message based at least in part on signal strength metrics received from the intermediary systems. In some embodiments, the remote server can estimate the actual location of the barcode-reading device based at least in part on the information received from the intermediary systems.

In some embodiments, the transmission of a beacon message by a barcode-reading device can occur asynchronously with respect to the receiving of the beacon message by an intermediary system. In other words, in some embodiments there may not be any synchronization or coordination between a barcode-reading device and an intermediary system with respect to the sending and receiving of beacon messages.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
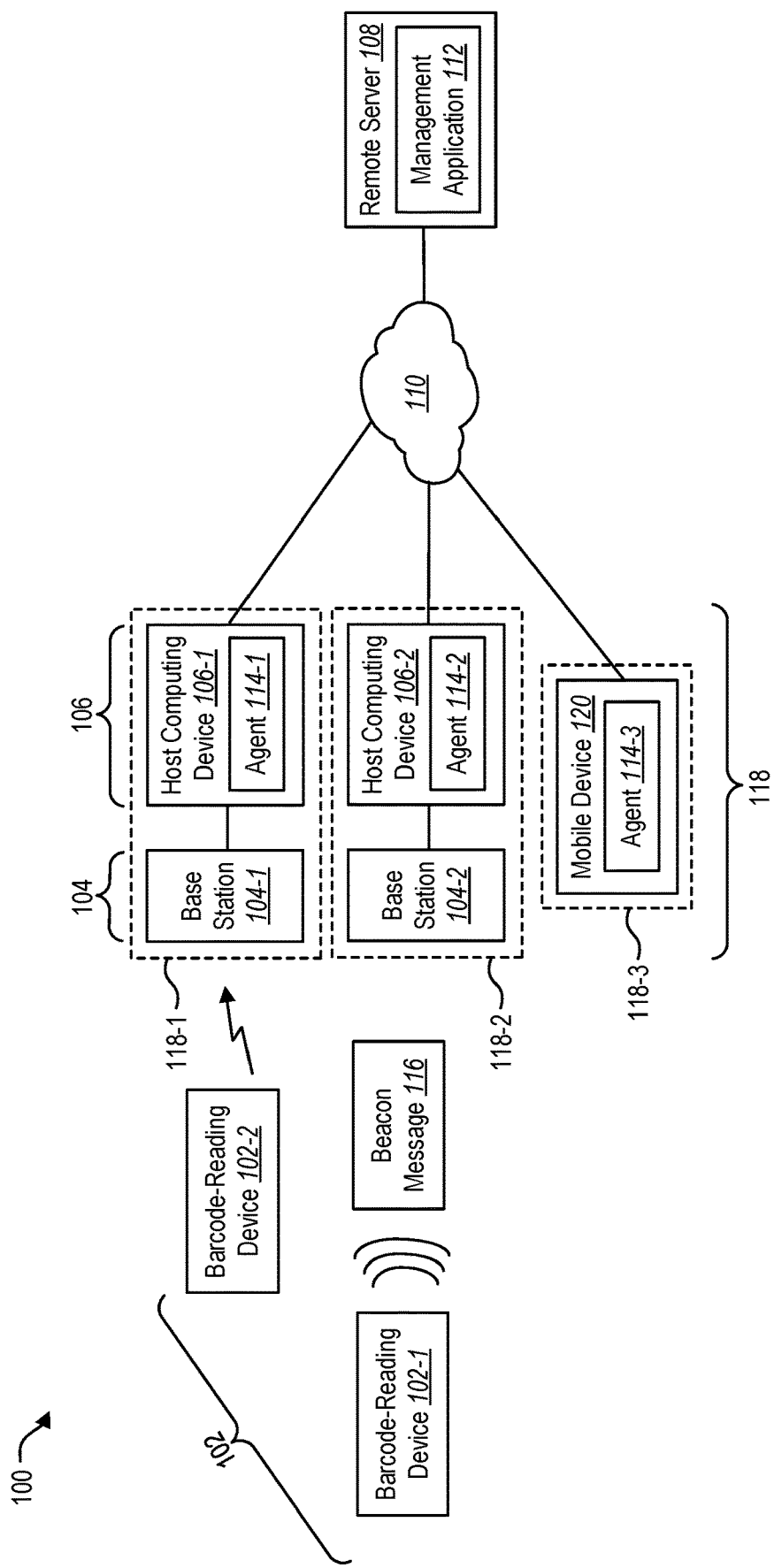
FIG. 1 illustrates an example of a barcode-reading system that comprises a barcode-reading device that is configured to transmit a beacon message to one or more intermediary systems, which can be configured to forward at least some of the contents of the beacon message to a remote server.

FIG. 1 illustrates an example of a barcode-reading system 100 in which the techniques disclosed herein can be utilized. The barcode-reading system includes a plurality of barcode-reading devices 102, including a first barcode-reading device 102-1 and a second barcode-reading device 102-2. The barcode-reading system 100 also includes a plurality of base stations 104, including a first base station 104-1 and a second base station 104-2. The barcode-reading system 100 also includes a plurality of host computing devices 106, including a first host computing device 106-1 and a second host computing device 106-2. The first base station 104-1 is communicatively coupled to the first host computing device 106-1, and the second base station 104-2 is communicatively coupled to the second host computing device 106-2.

For simplicity, the barcode-reading system 100 shown in FIG. 1 only includes two barcode-reading devices 102-1, 102-2, two base stations 104-1, 104-2, and two host computing devices 106-1, 106-2. However, those skilled in the art will recognize that the techniques disclosed herein can be utilized in a barcode-reading system that includes many more barcode-reading devices 102, base stations 104, and/or host computing devices 106.

The barcode-reading system 100 also includes a remote server 108 that is communicatively coupled to the host computing devices 106. The remote server 108 includes a management application 112. The management application 112 enables certain management operations to be performed with respect to the barcode-reading devices 102. The management application 112 communicates with agents running on the host computing devices 106. FIG. 1 shows a first agent 114-1 running on the first host computing device 106-1 and a second agent 114-2 running on the second host computing device 106-2. FIG. 1 also shows a third agent 114-3 running on a mobile device 120.

Communication between the host computing devices 106 and the remote server 108 can occur via one or more computer networks 110. In some embodiments, the remote server 108 can be located in the "cloud." In other words, communication between the host computing devices 106 and the remote server 108 can occur via the Internet. In some embodiments, the remote server 108 can be part of a cloud computing infrastructure that is maintained and operated by a cloud computing provider for the purpose of providing cloud computing services. Examples of such cloud computing services include Amazon Web Services (AWS) and Microsoft Azure. This type of cloud is commonly referred to as a public cloud. In other embodiments, the remote server 108 can be part of a private cloud.

Although only one remote server 108 is shown in FIG. 1, the functionality that is described herein in connection with the remote server 108 can be implemented using a plurality of different servers working together.

As noted above, a paired connection can be established between a barcode-reading device 102 and a base station 104. When a paired connection is established between a barcode-reading device 102 and a base station 104, any decoded data that is generated by the barcode-reading device 102 can be automatically sent to the base station 104. For example, suppose that a paired connection is established between the second barcode-reading device 102-2 and the first base station 104-1. If the second barcode-reading device 102-2 reads a barcode while there is a paired connection between the second barcode-reading device 102-2 and the first base station 104-1, the second barcode-reading device 102-2 can automatically send the decoded data to the first base station 104-1. The first base station 104-1 can then provide the decoded data to the first host computing device 106-1.

When a paired connection has been established between a barcode-reading device 102 and a base station 104, communication between the barcode-reading device 102 and the base station 104 can occur wirelessly. In some embodiments, wireless communication between a barcode-reading device 102 and a base station 104 can occur via a short-range wireless communication protocol, such as Bluetooth.

As noted above, the techniques disclosed herein are generally related to communicating information about barcode-reading devices 102. In some embodiments, the techniques disclosed herein can make it easier to find a lost or misplaced barcode-reading device 102. The techniques disclosed herein involve the use of beacon messages 116. In accordance with the present disclosure, a barcode-reading device 102 can be configured to transmit a beacon message 116 under certain circumstances in which the barcode-reading device 102 may be lost, or may be likely to become lost, such as when a barcode-reading device 102 becomes unintentionally disconnected from a base station 104. For example, suppose that a paired connection is established between the first barcode-reading device 102-1 and the first base station 104-1, and then the first barcode-reading device 102-1 becomes disconnected from the first base station 104-1. Further suppose that the first barcode-reading device 102-1 did not initiate the disconnection from the first base station 104-1. In this type of situation, the first barcode-reading device 102-1 may begin to transmit a beacon message 116 at some point in time after being disconnected from the first base station 104-1.

In some embodiments, the beacon message 116 that is transmitted by a barcode-reading device 102 can be a Bluetooth beacon message. In other words, the sending and the receiving of the beacon message 116 can occur in accordance with the beacon feature of the Bluetooth protocol.

The barcode-reading system 100 can include a plurality of intermediary systems 118. As noted above, an intermediary system 118 can be any device or combination of devices that can receive a beacon message 116 sent by a barcode-reading device 102 and forward at least some of the contents of the beacon message 116 to a remote server 108.

Many different types of intermediary devices 118 can be utilized in accordance with the techniques disclosed herein. Under some circumstances, an intermediary system 118 can include a base station 104 that is communicatively coupled to a host computing device 106. For example, the first intermediary system 118-1 includes the first base station 104-1 communicatively coupled to the first host computing device 106-1, and the second intermediary system 118-2 includes the second base station 104-2 communicatively coupled to the second host computing device 106-2.

However, it is not necessary for an intermediary system 118 to include a base station 104 and a host computing device 106. An intermediary system 118 can include a different type of device and/or a different combination of devices. For example, the barcode-reading system 100 includes a third intermediary system 118-3 that includes a mobile device 120 having an application (in the form of an agent 114-3) that can be configured to receive and forward beacon messages 116 to the remote server 108. In the depicted example, the agent 114-3 communicates with the management application 112 on the remote server 108.

Figure 2:
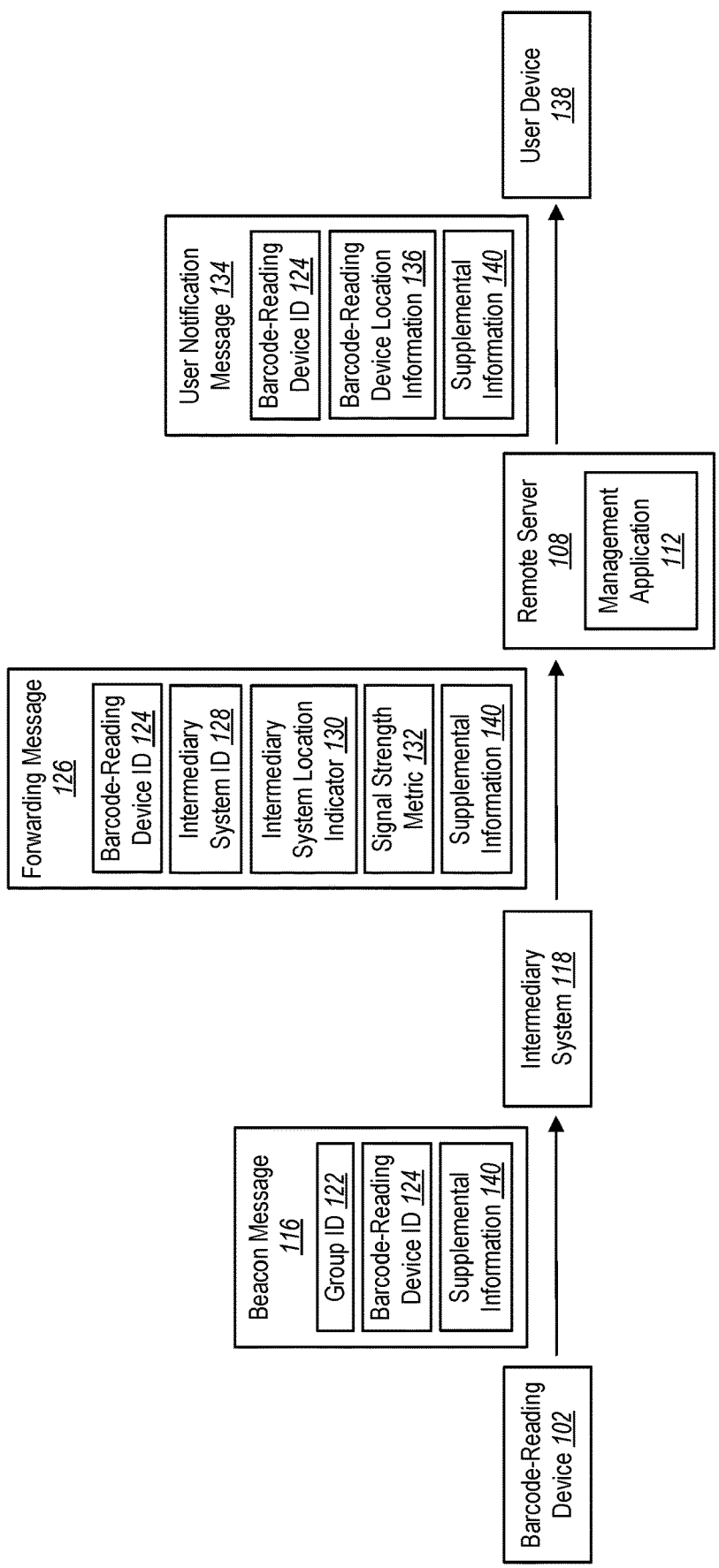
FIG. 2 illustrates an example of a beacon message that a barcode-reading device can transmit to one or more intermediary systems, an example of a forwarding message that an intermediary system can transmit to a remote server, and an example of a user notification message that a remote server can transmit to a user device.

The intermediary systems 118 can be configured to periodically listen for beacon messages 116 from barcode-reading devices 102. A beacon message 116 can include certain information that enables the intermediary systems 118 to recognize that the beacon message 116 has been sent by a barcode-reading device 102. For example, as shown in FIG. 2, a beacon message 116 can include a group ID 122 that is associated with the plurality of barcode-reading devices 102 as a group. When an intermediary system 118 receives a beacon message 116 that includes the group ID 122, the intermediary system 118 can interpret the presence of the group ID 122 in the beacon message 116 as an indication that the beacon message 116 was sent by a barcode-reading device 102.

In some embodiments, a group ID 122 can be associated with a plurality of barcode-reading devices 102 associated with a particular enterprise. Different enterprises can have different group IDs 122.

A beacon message 116 sent by a barcode-reading device 102 can also include a barcode-reading device ID 124 that uniquely identifies the barcode-reading device 102. The barcode-reading device ID 124 can be, for example, a serial number, a processor ID, a medium access control (MAC)

address, a universally unique ID (UUID), or the like. The presence of the barcode-reading device ID 124 in the beacon message 116 enables various entities in the barcode-reading system 100 to identify the specific barcode-reading device 102 that sent the beacon message 116. This can be useful for determining the location of the barcode-reading device 102.

A beacon message 116 sent by a barcode-reading device 102 can be received by one or more intermediary systems 118. The intermediary systems 118 can be configured to forward beacon messages 116 (or at least some of the contents of the beacon messages 116) to the remote server 108. When an intermediary system 118 receives a beacon message 116, the intermediary system 118 can determine whether the beacon message 116 includes the group ID 122. If an intermediary system 118 receives a beacon message 116 that does not include the group ID 122, then the intermediary system 118 can ignore (or take some other action in connection with) the beacon message 116. On the other hand, if an intermediary system 118 receives a beacon message 116 that includes the group ID 122, the intermediary system 118 can interpret the presence of the group ID 122 in the beacon message 116 as an indication that the beacon message 116 was sent by a barcode-reading device 102. Therefore, the intermediary system 118 can forward the beacon message 116 (or at least some of the contents of the beacon message 116) to the remote server 108.

As discussed above, a barcode-reading device 102 can be configured to begin transmitting a beacon message 116 when a barcode-reading device 102 becomes unintentionally disconnected from a base station 104. In some embodiments, a barcode-reading device 102 is unintentionally disconnected from a base station 104 when the barcode-reading device 102 becomes disconnected from the base station 104 but the barcode-reading device 102 did not initiate the disconnection from the base station 104.

In some embodiments, a base station 104 can only have a paired connection with one barcode-reading device 102 at a time. Thus, under some circumstances, establishing a paired connection between a barcode-reading device 102 and a base station 104 can cause another barcode-reading device 102 to be disconnected from the base station 104. For example, referring once again to FIG. 1, suppose that a paired connection is initially established between the first barcode-reading device 102-1 and the first base station 104-1. If a paired connection is subsequently established between the second barcode-reading device 102-2 and the first base station 104-1, this can cause the first barcode-reading device 102-1 to become disconnected from the first base station 104-1. In other words, the act of establishing a paired connection between the second barcode-reading device 102-2 and the first base station 104-1 can cause the paired connection between the first barcode-reading device 102-1 and the first base station 104-1 to be terminated. In this situation, it may be said that the first barcode-reading device 102-1 is unintentionally disconnected from the first base station 104-1.

In some embodiments, a barcode-reading device 102 may wait a certain period of time after being unintentionally disconnected from a base station 104 before starting to broadcast a beacon message 116. For example, a barcode-reading device 102 may set a timer in response to detecting that the barcode-reading device 102 has been unintentionally detected from the base station 104. The barcode-reading device 102 may then begin broadcasting the beacon message 116 when the timer expires.

To forward a beacon message 116 (or at least some of the contents of the beacon message 116) to the remote server 108, an intermediary system 118 can create and send a forwarding message 126 to the remote server 108. As shown in FIG. 2, the forwarding message 126 can include at least some of the contents of the beacon message 116, such as the barcode-reading device ID 124. The forwarding message 126 can also include additional information that was not included in the beacon message 116.

In some embodiments, the forwarding message 126 can include an identifier that uniquely identifies the intermediary system 118. This type of identifier may be referred to herein as an intermediary system ID 128. The forwarding message 126 can also include information that identifies a location of the intermediary system 118. This type of information may be referred to herein as an intermediary system location indicator 130. The intermediary system ID 128 and/or the intermediary system location indicator 130 can be used for the purpose of notifying a user (or other interested party) about the location of the barcode-reading device 102.

The forwarding message 126 can also include a signal strength metric 132. As discussed above, the beacon message 116 is included in a wireless signal that is transmitted by the barcode-reading device 102 and received by one or more intermediary systems 118. The signal strength metric 132 in a forwarding message 126 sent by a particular intermediary system 118 can indicate the strength of the wireless signal that was received by that intermediary system 118. As will be described in greater detail below, the signal strength metric 132 can be useful in the event that a plurality of different intermediary systems 118 receive the beacon message 116 and send forwarding messages 126 to the remote server 108.

In response to receiving the forwarding message 126 from the intermediary system 118, the management application 112 on the remote server 108 can generate and send a user notification message 134 to one or more recipients. The remote server 108 can generate the user notification message 134 based at least in part on the information included in the forwarding message 126 received from the intermediary system 118. The user notification message 134 can include a barcode-reading device ID 124. The user notification message 134 can also include information that indicates, or is in some way related to, the location of the barcode-reading device 102. This type of information may be referred to herein as barcode-reading device location information 136. In some embodiments, the recipient(s) of the user notification message 134 can be individual(s) who are responsible for managing the barcode-reading system 100. A device used by someone who receives the user notification message 134 may be referred to herein as a user device 138.

In some embodiments, the barcode-reading device location information 136 can be based at least in part on the intermediary system ID 128 in the forwarding message 126. For example, the user notification message 134 can include a message saying that the barcode-reading device 102 has been located in the vicinity of a particular intermediary system 118, where the intermediary system 118 is identified by the intermediary system ID 128.

In some embodiments, the barcode-reading device location information 136 can be based at least in part on the intermediary system location indicator 130 in the forwarding message 126. For example, the intermediary system location indicator 130 can include GPS coordinates that identify the location of the intermediary system 118, and the user notification message 134 can include a message saying that the barcode-reading device 102 has been located in the vicinity of those GPS coordinates.

In some embodiments, the barcode-reading device location information 136 can be based at least in part on both the intermediary system ID 128 and the intermediary system location indicator 130 in the forwarding message 126. For example, the user notification message 134 can (i) indicate that the barcode-reading device 102 has been located in the vicinity of a particular intermediary system 118, as identified by the intermediary system ID 128, and also (ii) refer to information contained in the intermediary system location indicator 130, such as GPS coordinates, to specify the location of the barcode-reading device 102.

In some embodiments, the beacon message 116 sent by a barcode-reading device 102 can include other information in addition to the group ID 122 and the barcode-reading device ID 124. This other information is shown as supplemental information 140 in FIG. 2. The supplemental information 140 can take many different forms. In some embodiments, the supplemental information 140 include one or more of device data, camera data, and/or decoding metadata.

Some examples of device data that can be included as supplemental information 140 in a beacon message 116 are: battery status information that indicates to what extent a battery within the barcode-reading device 102 is charged, a model number, an operating system version, location information (which may, for example, be obtained from a global positioning system (GPS) receiver within the barcode-reading device 102), time information that indicates the current time when the beacon message 116 is sent, and so forth.

Some examples of camera data that can be included as supplemental information 140 in a beacon message 116 are: resolution information that indicates the resolution of the images captured by a camera 171 (shown in FIG. 7) in the barcode-reading device 102, information that indicates which of multiple cameras 171 is being used by the barcode-reading device 102, region of interest (ROI) data that indicates where a barcode is expected to be located in an image captured by the camera 171, camera settings (e.g., the ISO setting that is being used, the zoom level that is being used, the camera APIs that have been called), and so forth.

Some examples of decoding metadata that can be included as supplemental information 140 in a beacon message 116 are: symbology of decoded barcodes, print quality, module size, contrast, decoding statistics, and so forth.

In some embodiments, the supplemental information 140 can include license data. Such information can be useful in embodiments where a license key is needed to enable one or more features of a decoder utilized by the barcode-reading device 102.

If a beacon message 116 includes supplemental information 140, an intermediary system 118 can include some or all of the supplemental information 140 in a forwarding message 126 that is sent to the management application 112 on the remote server 108. The remote server 108 can process the supplemental information 140 to determine additional information (e.g., metrics, performance indicators) about the barcode-reading device 102.

Some or all of the supplemental information 140 could be included in the user notification message 134 that the remote server 108 sends to user device(s) 138. For example, if the supplemental information 140 includes a battery status indicator, including the battery status indicator in the user notification message 134 could be beneficial, especially if the charging level of the battery is less than a pre-defined amount. Including the battery status indicator in the user notification message 134 in this type of situation would alert the recipient(s) of the user notification message 134 that there is some urgency to retrieving the barcode-reading device 102 from its current location (as indicated by the barcode-reading device location information 136) because the barcode-reading device 102 is close to being out of power.

In a case where an intermediary system 118 includes a base station 104 and a host computing device 106, the base station 104 can forward the beacon message 116 (or at least some of the contents of the beacon message 116) to the host computing device 106, and the host computing device 106 can create the forwarding message 126. This is illustrated in FIG. 3.

Figure 3:
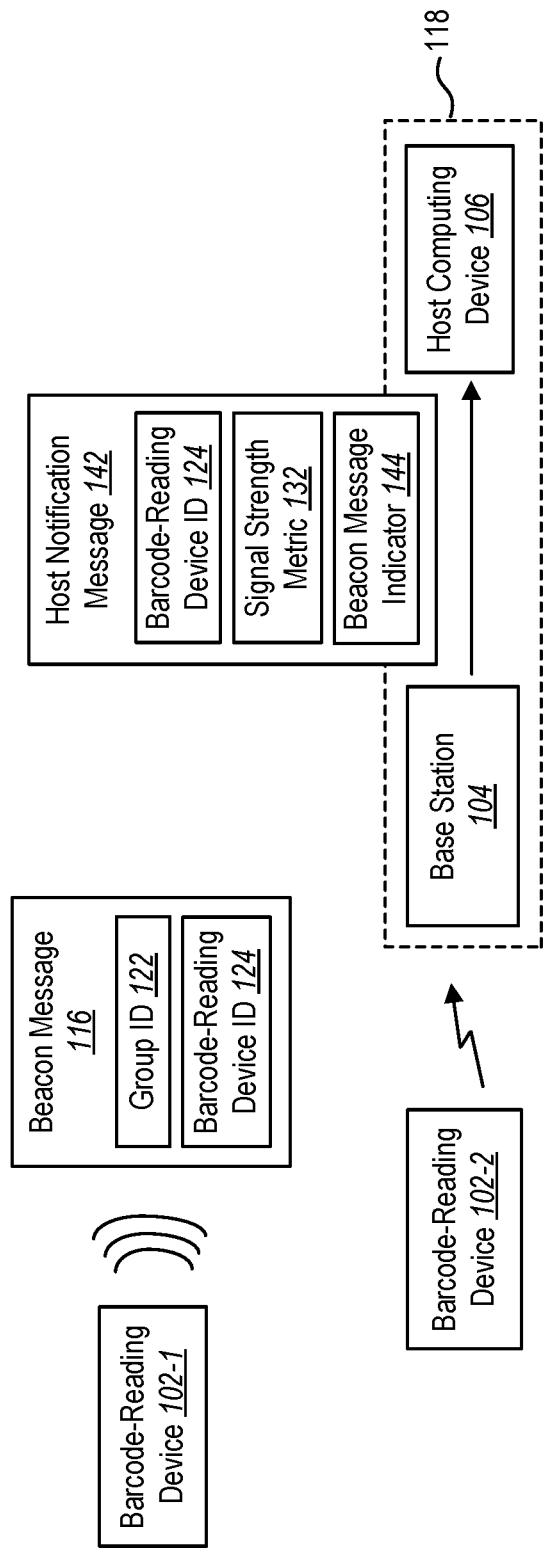
FIG. 3 illustrates an example of an intermediary system that comprises a base station communicatively coupled to a host computing device, wherein the base station is configured to receive a beacon message and forward the beacon message to the host computing device.

FIG. 3 shows an intermediary system 118 receiving a beacon message 116 sent by the first barcode-reading device 102-1. When the base station 104 receives the beacon message 116, the base station 104 can notify the host computing device 106 about the receipt of the beacon message 116. For example, in response to receiving the beacon message 116 and determining that the beacon message 116 includes a group ID 122, the base station 104 can create and send a message to the host computing device 106. The message that the base station 104 creates and sends to the host computing device 106 may be referred to herein as a host notification message 142.

The host notification message 142 can include at least some of the contents of the beacon message 116, such as the barcode-reading device ID 124. The host notification message 142 can also include additional information that is not included in the beacon message 116. For example, the host notification message 142 can include a signal strength metric 132. As noted above, the beacon message 116 is included in a wireless signal that is sent by the barcode-reading device 102-1 and received by the base station 104. The signal strength metric 132 can indicate the strength of this wireless signal.

In the depicted example, it will be assumed that a paired connection has been established between the second barcode-reading device 102-2 and the base station 104 when the first barcode-reading device 102-1 transmits the beacon message 116. In general, when the base station 104 sends data to the host computing device 106, the host computing device 106 can assume that the data comes from the currently connected barcode-reading device 102-2. Therefore, it is possible that the host computing device 106 could interpret the host notification message 142 as coming from the second barcode-reading device 102-2 even though the host notification message 142 includes information from the beacon message 116 sent by the first barcode-reading device 102-1.

To address this issue, the host notification message 142 can additionally include an indication that the contents of the host notification message 142 originate from (or otherwise correspond to) a device other than the currently connected barcode-reading device 102-2. This type of indication may be referred to herein as a beacon message indicator 144. The beacon message indicator 144 can be useful in a situation where the host computing device 106 expects to receive data from a barcode-reading device 102-2 other than the barcode-reading device 102-1 that sent the beacon message 116. In other words, the beacon message indicator 144 in the host notification message 142 can have the effect of signaling to the host computing device 106 that the contents of the host notification message 142 are not from the currently connected barcode-reading device 102-2 but are instead from a beacon message 116 sent by a different barcode-reading device 102-1. When a host computing device 106 receives a host notification message 142 from a base station 104, the host computing device 106 can generate a forwarding message 126, as described above.

As noted above, under some circumstances a plurality of intermediary systems 118 can receive a beacon message 116 and forward the beacon message 116 (or at least some of the contents of the beacon message 116) to the management application 112 running on the remote server 108. For example, a plurality of intermediary systems 118 can receive a beacon message 116, generate a forwarding message 126 (as described above), and send the forwarding message 126 to the management application 112 running on the remote server 108. When the management application 112 receives a plurality of forwarding messages 126 from a plurality of different intermediary systems 118 and the plurality of forwarding messages 126 correspond to the same beacon message 116, the management application 112 can determine location information 136 about the barcode-reading device 102 that sent the beacon message 116 based at least in part on the plurality of forwarding messages 126. In other words, the management application 112 can take into consideration information from all of the forwarding messages 126 when it determines the barcode-reading device location information 136.

Figure 4:
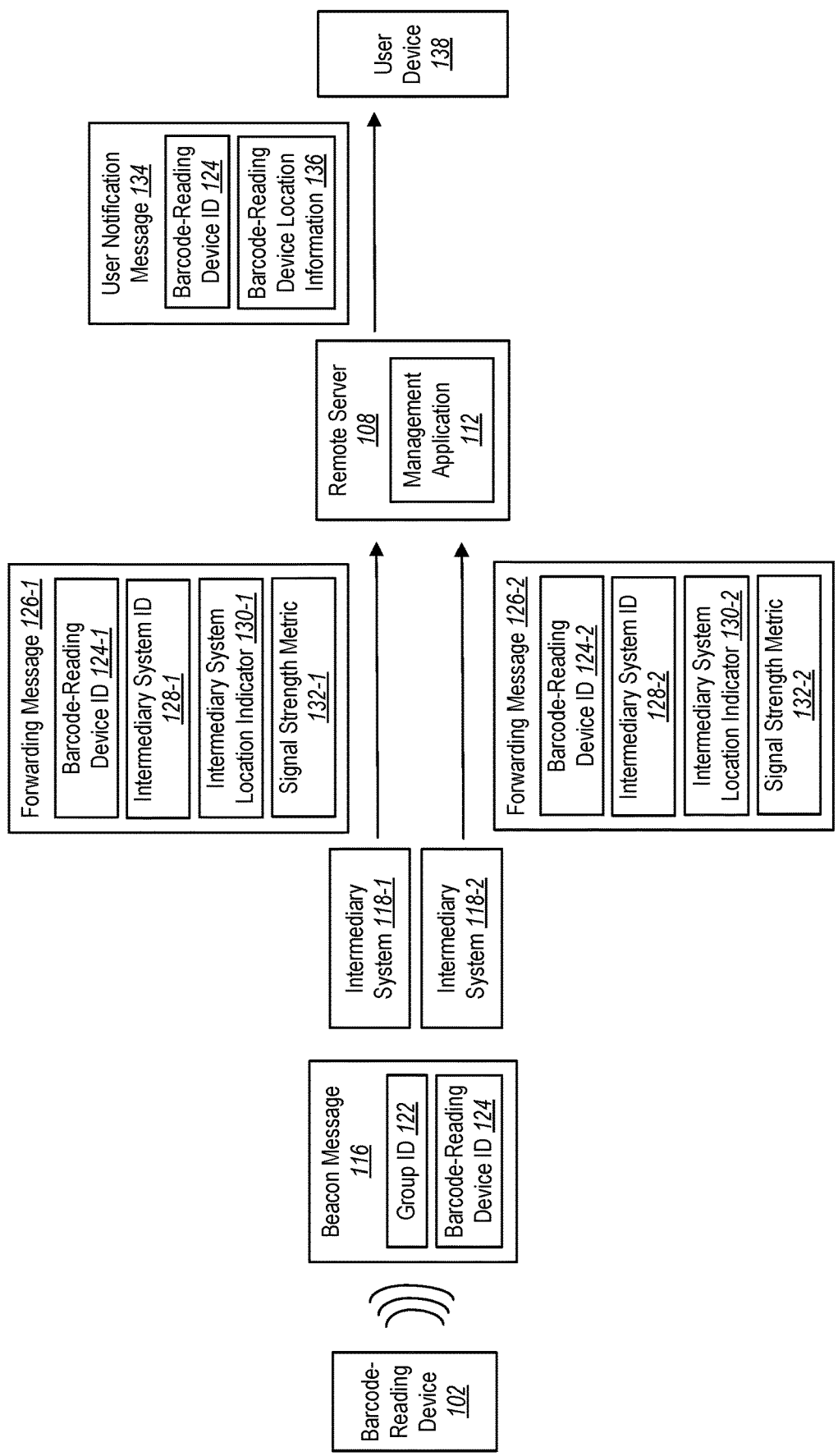
FIG. 4 illustrates an example of a remote server receiving a plurality of forwarding messages from a plurality of intermediary systems.

FIG. 4 illustrates an example showing how this can occur. In the depicted example, a barcode-reading device 102 transmits a beacon message 116. The beacon message 116 is received by the first intermediary system 118-1 and the second intermediary system 118-2. The first intermediary system 118-1 generates a first forwarding message 126-1 and sends the first forwarding message 126-1 to the management application 112 running on the remote server 108. Similarly, the second intermediary system 118-2 generates a second forwarding message 126-2 and sends the second forwarding message 126-2 to the management application 112 running on the remote server 108.

The forwarding messages 126-1, 126-2 can both be similar to the forwarding message 126 described previously. Thus, the first forwarding message 126-1 can include a first barcode-reading device ID 124-1, a first intermediary system ID 128-1, a first intermediary system location indicator 130-1, and a first signal strength metric 132-1. Similarly, the second forwarding message 126-2 can include a second barcode-reading device ID 124-2, a second intermediary system ID 128-2, a second intermediary system location indicator 130-2, and a second signal strength metric 132-2.

In response to receiving the forwarding messages 126-1, 126-2 from the intermediary systems 118-1, 118-2, the management application 112 can determine barcode-reading device location information 136 (i.e., location information about the barcode-reading device 102, as described above). The management application 112 can also generate and send a user notification message 134 to one or more user devices 138. The user notification message 134 can include the barcode-reading device ID 124 and the barcode-reading device location information 136.

As discussed above, the barcode-reading device location information 136 in the user notification message 134 can include a reference to an intermediary system 118. For example, the user notification message 134 can include a message saying that the barcode-reading device 102 has been located in the vicinity of a particular intermediary system 118, where the intermediary system 118 can be identified by its intermediary system ID 128.

In some embodiments, the management application 112 can select which intermediary system 118-1, 118-2 should be referenced by the barcode-reading device location information 136 based at least in part on the signal strength metrics 132-1, 132-2 included in the forwarding messages 126-1, 126-2. For example, if a comparison of the signal strength metrics 132-1, 132-2 indicates that the wireless signal received by the first intermediary system 118-1 is stronger than the wireless signal received by the second intermediary system 118-2, then the management application 112 can select the first intermediary system 118-1 and the barcode-reading device location information 136 in the user notification message 134 can refer to the first intermediary system 118-1. Conversely, if a comparison of the signal strength metrics 132-1, 132-2 indicates that the wireless signal received by the second intermediary system 118-2 is stronger than the wireless signal received by the first intermediary system 118-1, then the management application 112 can select the second intermediary system 118-2 and the barcode-reading device location information 136 in the user notification message 134 can refer to the second intermediary system 118-2.

In some embodiments, the management application 112 can estimate the actual location of the barcode-reading device 102 based at least in part on the information contained in the forwarding messages 126-1, 126-2. For example, the actual location of the barcode-reading device 102 can be estimated based at least in part on the intermediary system location indicators 130-1, 130-2 and the signal strength metrics 132-1, 132-2 in the forwarding messages 126. In embodiments where the management application 112 estimates the actual location of the barcode-reading device 102, the barcode-reading device location information 136 in the user notification message 134 can include the estimated location of the barcode-reading device 102.

In some embodiments, the transmission of a beacon message 116 by a barcode-reading device 102 occurs asynchronously with respect to the receiving of the beacon message 116 by an intermediary system 118. In other words, in some embodiments there is no synchronization or coordination between a barcode-reading device 102 and an intermediary system 118 with respect to the sending and receiving of beacon messages 116. An example of this is shown in FIGS. 5A and 5B.

Figure 5A:
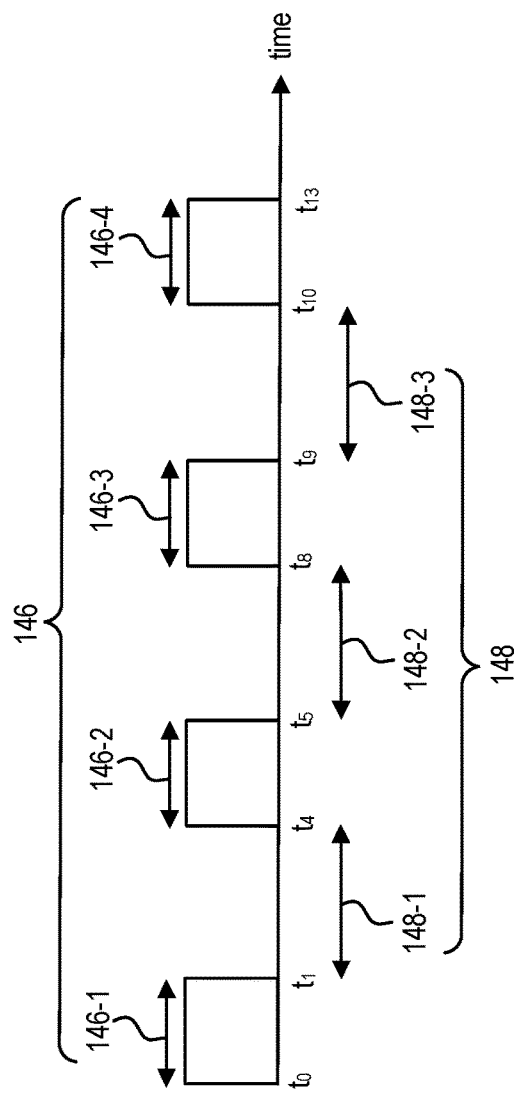
FIG. 5A is a timing diagram that illustrates an example showing how a barcode-reading device can transmit beacon messages.
Figure 5B:
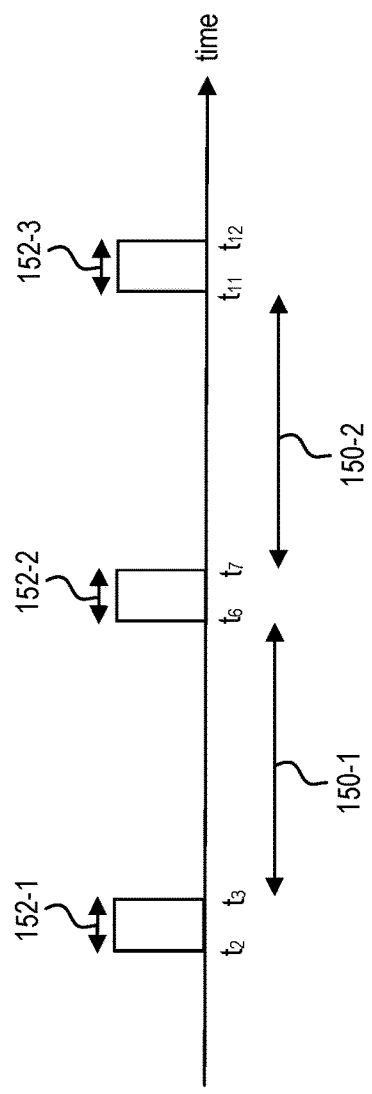
FIG. 5B is a timing diagram that illustrates an example showing how an intermediary system can listen for beacon messages.

FIGS. 5A and 5B are timing diagrams. FIG. 5A illustrates the behavior of the barcode-reading device 102 with respect to transmitting beacon messages 116, and FIG. 5B illustrates the behavior of the intermediary system 118 with respect to receiving beacon messages 116.

FIGS. 5A and 5B include references to particular points in time ($t_1$, $t_2$, etc.), and the numbers used indicate the temporal order in which the particular points in time occur. In general, $t_{N+1}$ occurs after $t_N$. So, for example, $t_2$ occurs after $t_1$, $t_3$ occurs after $t_2$, and so forth.

The timing diagrams in FIGS. 5A and 5B use the same time scale. Thus, $t_2$ in FIG. 5B occurs after $t_1$ in FIG. 5A, $t_4$ in FIG. 5A occurs after $t_3$ in FIG. 5B, and so forth.

Reference is initially made to FIG. 5A. In the depicted example, once a barcode-reading device 102 has started to transmit beacon messages 116, the barcode-reading device 102 is configured to alternate between two different modes of operation, which may be referred to as a transmission mode and a non-transmission mode. When the barcode-reading device 102 is in the transmission mode, the barcode-reading device 102 transmits beacon messages 116. When the barcode-reading device 102 is in the non-transmission mode, the barcode-reading device 102 does not transmit beacon messages 116. A time period when a barcode-reading device 102 is in the transmission mode may be referred to as a transmission interval 146. A time period when a barcode-reading device 102 is in the non-transmission mode may be referred to as a non-transmission interval 148.

More specifically, the barcode-reading device 102 begins transmitting a beacon message 116 at time $t_0$. As discussed above, the barcode-reading device 102 can begin transmitting the beacon message 116 based at least in part on detecting that the barcode-reading device 102 has been unintentionally disconnected from a base station 104. The barcode-reading device 102 can transmit the beacon message 116 for a pre-defined time period. At time $t_1$, the barcode-reading device 102 can discontinue transmitting the beacon message 116. Thus, the time period between $t_0$ and $t_1$ is a first transmission interval 146-1 in which the barcode-reading device 102 operates in the transmission mode and transmits the beacon message 116.

A first non-transmission interval 148-1, in which the barcode-reading device 102 operates in a non-transmission mode and does not transmit the beacon message 116, begins at time $t_1$. The first non-transmission interval 148-1 continues until time $t_4$, when the barcode-reading device 102 begins transmitting the beacon message 116 again. The second transmission interval 146-2 continues until time $t_5$, when the barcode-reading device 102 discontinues transmitting the beacon message 116 once again. The second transmission interval 146-2 is followed by a second non-transmission interval 148-2 (from time $t_5$ to time $t_8$), a third transmission interval 146-3 (from time $t_8$ to time $t_9$), a third non-transmission interval 148-3 (from time $t_9$ to time $t_{10}$), a fourth transmission interval 146-4 (from time $t_{10}$ to time $t_{13}$), and so on. This pattern of alternating between transmission intervals 146 and non-transmission intervals 148 can continue indefinitely, as long as the barcode-reading device 102 has power.

Reference is now made to FIG. 5B. In the depicted example, an intermediary system 118 is configured to alternate between two different modes of operation, which may be referred to as a data reception mode and a beacon listening mode. When the intermediary system 118 is in the data reception mode, the intermediary system 118 is available to receive data from a connected barcode-reading device 102 (i.e., a barcode-reading device 102 with which the intermediary system 118 has a paired connection). When the intermediary system 118 is in the beacon listening mode, the intermediary system 118 is not available to receive data from a connected barcode-reading device 102 and instead listens for beacon messages 116. A time period when an intermediary system 118 is in the data reception mode may be referred to as a data reception interval 150. A time period when an intermediary system 118 is in the beacon listening mode may be referred to as a beacon listening interval 152.

As shown in FIG. 5B, the intermediary system 118 transitions from the data reception mode to the beacon listening mode at time $t_2$. The time period from time $t_2$ to time $t_3$ is a first beacon listening interval 152-1. The intermediary system 118 transitions back to the data reception mode at time $t_6$. The time period from time $t_3$ to time $t_6$ is a first data reception interval 150-1. The first data reception interval 150-1 is followed by a second beacon listening interval 152-2, a second data reception interval 150-2, a third beacon listening interval 152-3, and so on. This pattern of alternating between data reception intervals 150 and beacon listening intervals 152 can continue indefinitely.

As can be seen, in the depicted example the transmission intervals 146 of the barcode-reading device 102 are not synchronized with the beacon listening intervals 152 of the intermediary system 118. In other words, the barcode-reading device 102 does not know when the intermediary system 118 is going to be in the beacon listening mode, and the intermediary system 118 does not know when the barcode-reading device 102 is going to be in the transmission mode. The barcode-reading device 102 periodically transmits beacon messages 116, and it is assumed that at some point there will be some overlap between a transmission interval 146 of the barcode-reading device 102 and a beacon listening interval 152 of the intermediary system 118.

In the depicted example, the transmission intervals 146-1, 146-2, 146-3 of the barcode-reading device 102 do not overlap with any beacon listening intervals 152 of the intermediary system 118. Thus, the beacon messages 116 transmitted by the barcode-reading device 102 during the transmission intervals 146-1, 146-2, 146-3 are not received by the intermediary system 118. However, the fourth transmission interval 146-4 of the barcode-reading device 102 does overlap with the third beacon listening interval 152-3 of the intermediary system 118. Thus, one or more beacon messages 116 transmitted by the barcode-reading device 102 during the fourth transmission interval 146-4 could potentially be received by the intermediary system 118 during the third beacon listening interval 152-3.

In the depicted example, the transmission intervals 146 all have the same duration, the non-transmission intervals 148 all have the same duration, the data reception intervals 150 all have the same duration, and the beacon listening intervals 152 all have the same duration. However, in an alternative embodiment, the duration of one or more of the transmission intervals 146, the non-transmission intervals 148, the data reception intervals 150, and/or the beacon listening intervals 152 could vary over time.

In the depicted example, the duration of the transmission intervals 146 is longer than the duration of the beacon listening intervals 152, while the duration of the non-transmission intervals 148 is shorter than the duration of the data reception intervals 150. However, in an alternative embodiment, the relative durations of the various intervals 146, 148, 150, 152 could be modified as desired.

The specific characteristics of the example shown in FIGS. 5A and 5B should not be interpreted as limiting the scope of the present disclosure. Although the example shown in FIGS. 5A and 5B illustrates an embodiment in which an intermediary system 118 alternates between a data reception mode and a beacon listening mode, it is not necessary for an intermediary system 118 to be configured this way. In an alternative embodiment, an intermediary system 118 could be capable of simultaneously receiving data from a connected barcode-reading device 102 and also listening for beacon messages 116. If an intermediary system 118 receives data from a connected barcode-reading device 102 at the same time that a beacon message 116 is received, the intermediary system 118 could be capable of handling both the data from the connected barcode-reading device 102 and the beacon message 116. In particular, the intermediary system 118 could provide the data from the connected barcode-reading device 102 to a corresponding host computing device 106. The intermediary system 118 could also forward at least some of the contents of the beacon message 116 to a remote server 108, as described above.

Under some circumstances, a barcode-reading device 102 may be capable of receiving a beacon message 116 from another barcode-reading device 102 and forwarding the beacon message 116 to an intermediary system 118. This can be useful in a situation where a barcode-reading device 102 is located outside the range of any intermediary systems 118.

Figure 6:
FIG. 6 illustrates an example in which a barcode-reading device is located outside the range of any intermediary system and its beacon message is received by another barcode-reading device.

An example of this feature is shown in FIG. 6. In the depicted example, it will be assumed that the first barcode-reading device 102-1 does not have a paired connection with any intermediary system 118, and that the first barcode-reading device 102-1 is located outside the range of any intermediary system 118. Thus, when the first barcode-reading device 102-1 transmits a beacon message 116, no intermediary system 118 is able to receive the beacon message 116 directly from the first barcode-reading device 102-1.

However, the second barcode-reading device 102-2 is capable of receiving a beacon message 116 from another barcode-reading device 102. When the second barcode-reading device 102-2 receives the beacon message 116 from the first barcode-reading device 102-1, the second barcode-reading device 102-2 forwards the beacon message 116 to an intermediary system 118. FIG. 6 shows the second barcode-reading device 102-2 sending a forwarded beacon message 154 to the intermediary system 118. In some embodiments, the forwarded beacon message 154 can be identical to the beacon message 116. Alternatively, there can be some differences between the forwarded beacon message 154 and the beacon message 116. The forwarded beacon message 154 can include at least the group ID 122 and the barcode-reading device ID 124 from the beacon message 116.

Figure 7:
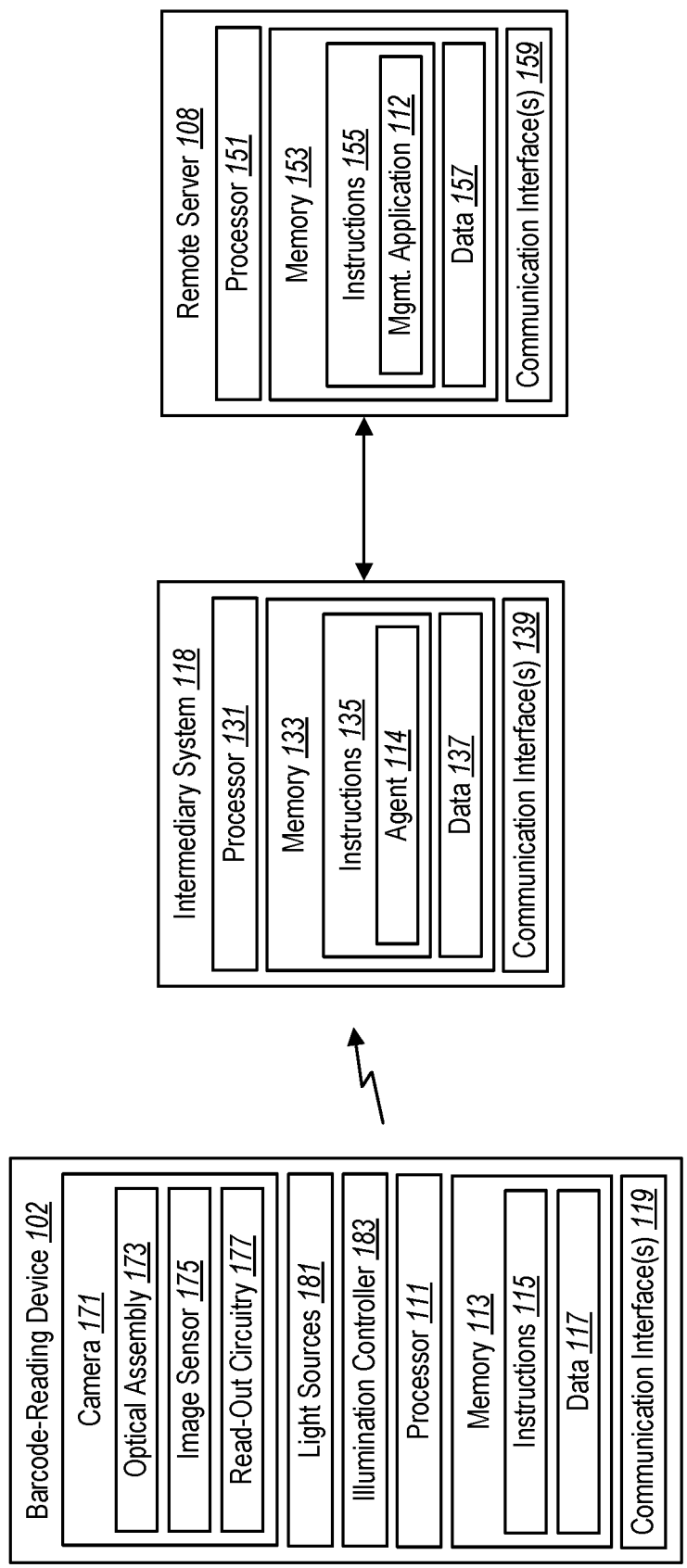
FIG. 7 illustrates certain components that can be included in a barcode-reading device, an intermediary system, and a remote server.

FIG. 7 illustrates certain components that can be included in a barcode-reading device 102, an intermediary system 118, and a remote server 108.

The barcode-reading device 102 can include a camera 171 that is configured to capture images. The camera 171 can be a digital camera, and the images captured by the camera 171 can be digital images.

The camera 171 can include an optical assembly 173 including one or more lenses. The camera 171 can also include an image sensor 175. The image sensor 175 may alternatively be referred to as an imager, a photosensor array, etc. The image sensor 175 can be a solid-state device that is configured to detect and convey information used to make an image. The image sensor 175 can include a relatively large number of light-sensitive pixels that are arranged in horizontal rows and vertical columns. The image sensor 175 can be a charge-coupled display (CCD) image sensor, a complementary metal-oxide-semiconductor (CMOS) image sensor, or another type of image sensor.

The lens(es) within the optical assembly 173 can be configured to receive light reflected from objects within the field of view of the camera 171 and focus this reflected light onto the image sensor 175. The camera 171 can also include read-out circuitry 177 that is configured to electronically read the pixels within the image sensor 175 to provide an image (i.e., a two-dimensional array of image data).

The barcode-reading device 102 can include a plurality of light sources 181 that can be activated to illuminate a barcode. The barcode-reading device 102 also includes an illumination controller 183 that controls the activation and deactivation of the light sources 181.

At least some of the functionality described herein in relation to the barcode-reading device 102, intermediary system 118, and remote server 108 can be implemented via execution of instructions stored in memory by one or more processors.

The barcode-reading device 102 is shown with a processor 111 and memory 113 that is communicatively coupled to the processor 111. Instructions 115 and data 117 can be stored in the memory 113. The instructions 115 can be executable by the processor 111 to implement some or all of the methods, steps, operations, actions, or other functionality that is disclosed herein in connection with the barcode-reading device 102. Executing the instructions 115 can involve the use of the data 117 that is stored in the memory 113.

Similarly, the intermediary system 118 is shown with a processor 131 and memory 133 that is communicatively coupled to the processor 131. Instructions 135 and data 137 can be stored in the memory 133. The instructions 135 can be executable by the processor 131 to implement some or all of the methods, steps, operations, actions, or other functionality that is disclosed herein in connection with the intermediary system 118. Executing the instructions 135 can involve the use of the data 137 that is stored in the memory 133.

In addition, the remote server 108 is shown with a processor 151 and memory 153 that is communicatively coupled to the processor 151. Instructions 155 and data 157 can be stored in the memory 153. The instructions 155 can be executable by the processor 151 to implement some or all of the methods, steps, operations, actions, or other functionality that is disclosed herein in connection with the remote server 108. Executing the instructions 155 can involve the use of the data 157 that is stored in the memory 153.

Although just a single processor is shown in each of the entities in FIG. 7 (the processor 111 in the barcode-reading device 102, the processor 131 in the intermediary system 118, and the processor 151 in the remote server 108), in an alternative embodiment a combination of processors could be used by any of these entities.

In some embodiments, the instructions 155 in the remote server 108 can include the management application 112, and the instructions 135 in the intermediary system 118 can include an agent (such as any of the agents 114-1, 114-2, 114-3 shown in FIG. 3).

The barcode-reading device 102, intermediary system 118, and remote server 108 can each include one or more communication interfaces. In particular, the barcode-reading device 102 is shown with communication interface(s) 119, the intermediary system 118 is shown with communication interface(s) 139, and the remote server 108 is shown with communication interface(s) 159. The communication interface(s) 119, 139, 159 can facilitate communication amongst the barcode-reading device 102, intermediary system 118, and remote server 108, and also between any of those entities and other entities that are not part of the barcode-reading system 100.

In some embodiments, at least some of the communication interface(s) 119, 139, 159 can be based on wireless communication technology. Some examples of communication interfaces that are based on wireless communication technology include a Bluetooth wireless communication adapter, a wireless adapter that operates in accordance with an Institute of Electrical and Electronics Engineers (IEEE) 802.11 wireless communication protocol, and an infrared (IR) communication port.

The communication interface(s) 119 in the barcode-reading device 102 can include a wireless transmitter that is configured to transmit beacon messages 116. The communication interface(s) 139 in the intermediary system 118 can include a wireless receiver that is configured to receive beacon messages 116. In some embodiments, the communication interface(s) in the barcode-reading device 102 can also include a wireless receiver that is configured to receive beacon messages 116 from another barcode-reading device 102 (as shown, for example, in FIG. 6).

In some embodiments, at least some of the communication interface(s) 119, 139, 159 can be based on wired communication technology. Some examples of communication interfaces that are based on wired communication technology include a Universal Serial Bus (USB) and an Ethernet adapter.

One or more of the communication interface(s) 139 in the intermediary system 118 can be utilized for transmitting forwarding messages 126 to the remote server 108, and one or more of the communication interface(s) 159 in the remote server 108 can be utilized for receiving the forwarding messages 126 from the intermediary system 118.

One or more of the communication interface(s) 159 in the remote server 108 can be utilized for transmitting user notification messages 134 to user device(s) 138.

Figure 8:
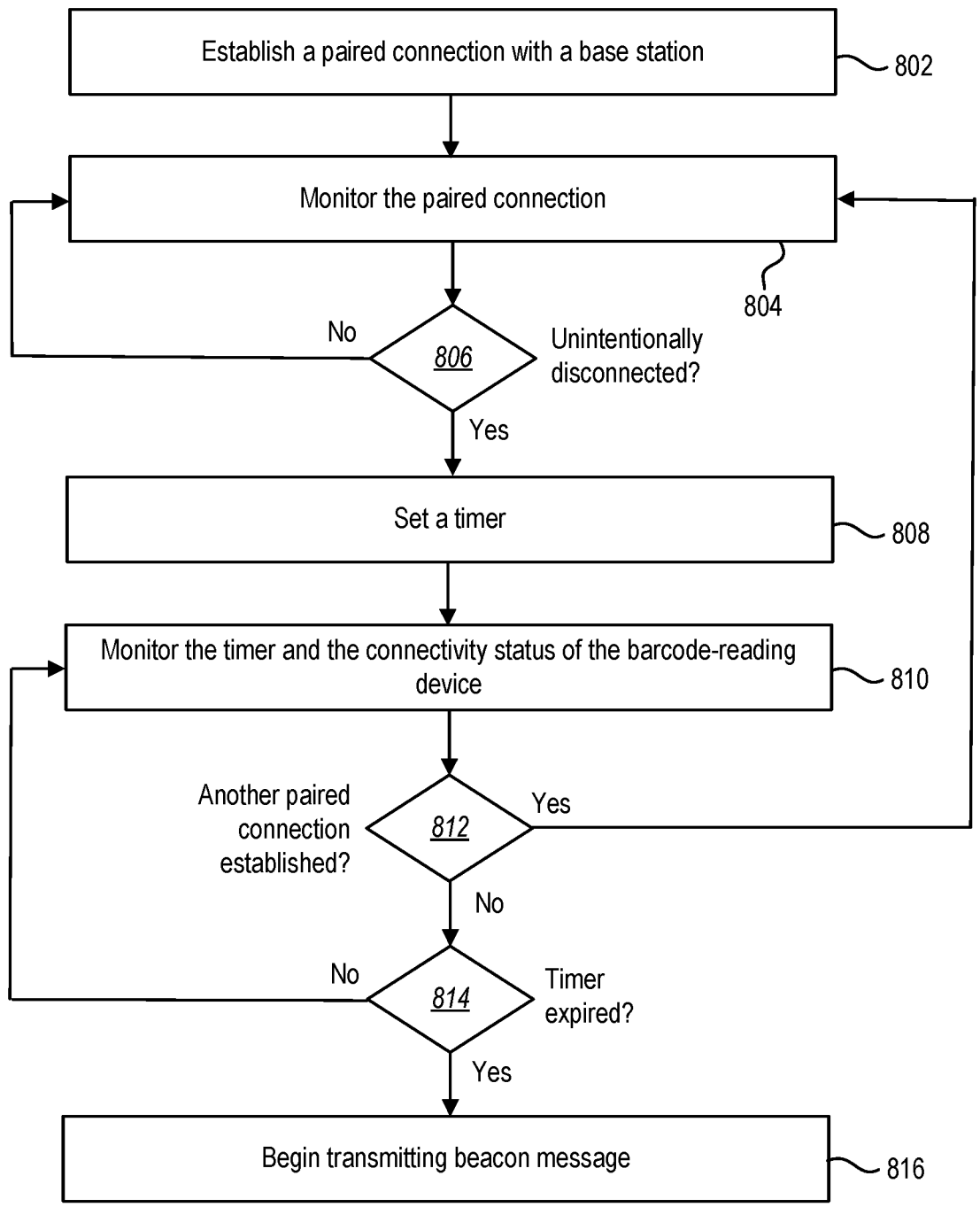
FIG. 8 illustrates an example of a method that can be performed by a barcode-reading device in accordance with the present disclosure.

FIG. 8 illustrates an example of a method 800 that can be performed by a barcode-reading device 102 in accordance with the present disclosure.

At 802, a barcode-reading device 102 can establish a paired connection with a base station 104. At 804, the barcode-reading device 102 can monitor the paired connection.

At 806, the barcode-reading device 102 can determine whether the barcode-reading device 102 has been unintentionally disconnected from the base station 104. In response to detecting that the barcode-reading device 102 has been unintentionally disconnected from the base station 104, then at 808 the barcode-reading device 102 can set a timer.

At 810, the barcode-reading device 102 can monitor the timer and also monitor the connectivity status of the barcode-reading device 102. At 812, the barcode-reading device 102 can determine whether another paired connection has been established (either with the base station 104 to which the barcode-reading device 102 was previously connected or with another base station 104). If another paired connection has been established, the method 800 can return to 804 and proceed as described above.

However, if another paired connection has not been established, then at 814 the barcode-reading device 102 can determine whether the timer has expired. When the barcode-reading device 102 determines that the timer has expired, then at 816 the barcode-reading device 102 can begin transmitting a beacon message 116. As discussed above, in some embodiments the barcode-reading device 102 can periodically transmit beacon messages 116, as shown in FIG. 5A.

Figure 9:
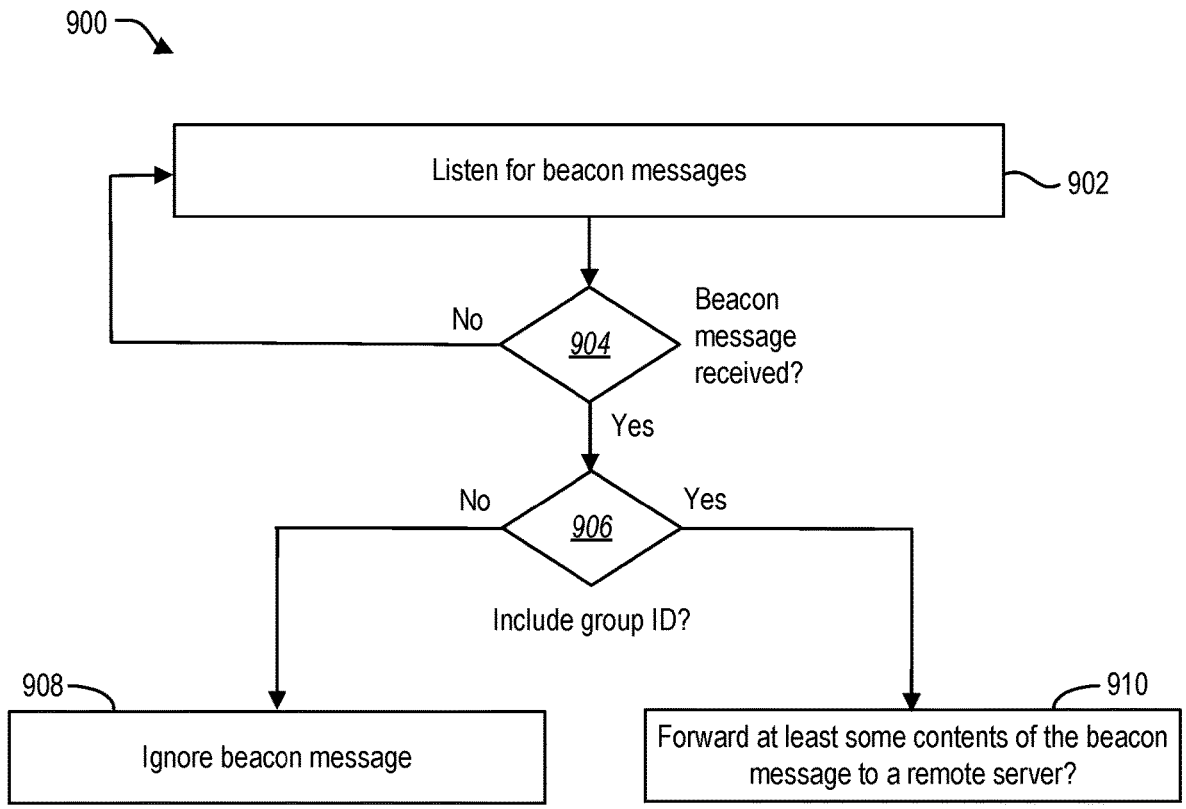
FIG. 9 illustrates an example of a method that can be performed by an intermediary system in accordance with the present disclosure.

FIG. 9 illustrates an example of a method 900 that can be performed by an intermediary system 118 in accordance with the present disclosure.

At 902, an intermediary system 118 can listen for beacon messages 116. In some embodiments, the intermediary system 118 can listen for beacon messages 116 that include a specific group ID 122. As discussed above, the group ID 122 can be associated with a plurality of barcode-reading devices 102 (e.g., the barcode-reading devices 102 associated with a particular enterprise).

At 904, the intermediary system 118 can determine whether a beacon message 116 has been received. In response to receiving a beacon message 116, the intermediary system 118 can determine whether the beacon message 116 includes the group ID 122.

If the intermediary system 118 determines that the beacon message 116 does not include the group ID 122, then at 908 the intermediary system 118 can ignore (or take some other action in connection with) the beacon message 116. However, if the intermediary system 118 determines that the beacon message 116 does include the group ID 122, then at 910 the intermediary system 118 can forward at least some contents of the beacon message 116 to a remote server 108.

The techniques disclosed herein can be implemented in hardware, software, firmware, or any combination thereof, unless specifically described as being implemented in a specific manner.

At least some of the features disclosed herein have been described as instructions that are executable by a processor to perform various operations, actions, or other functionality. The term "instructions" should be interpreted broadly to include any type of computer-readable statement(s). For example, the term "instructions" may refer to one or more programs, routines, sub-routines, functions, procedures, modules etc. "Instructions" may comprise a single computer-readable statement or many computer-readable statements. In addition, instructions that have been described separately in the above description can be combined as desired in various embodiments.

The term "processor" should be interpreted broadly to encompass a general-purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be communicatively coupled to a processor if the processor can read information from and/or write information to the memory. Memory that is integral to a processor is communicatively coupled to the processor.

The term "communicatively coupled" refers to coupling of components such that these components are able to communicate with one another through, for example, wired, wireless, or other communications media. The term "communicatively coupled" can include direct, communicative coupling as well as indirect or "mediated" communicative coupling. For example, a component A may be communicatively coupled to a component B directly by at least one communication pathway, or a component A may be communicatively coupled to a component B indirectly by at least a first communication pathway that directly couples component A to a component C and at least a second communication pathway that directly couples component C to component B. In this case, component C is said to mediate the communicative coupling between component A and component B.

The term "enterprise" can refer to an organization, venture, association, group, institution, or undertaking that exists for one or more particular purposes. Some examples of enterprises include corporations, small businesses, non-profit institutions, medical institutions or facilities (e.g., hospitals), government bodies, etc.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements.

The phrase "based on" does not mean "based only on," unless expressly specified otherwise. In other words, the phrase "based on" describes both "based only on" and "based at least on."

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

References to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system comprising:
   a barcode-reading device configured to transmit a beacon message based at least in part on detecting that the barcode-reading device has been unintentionally disconnected from a base station, wherein the beacon message comprises a group identifier associated with a group to which the barcode-reading device belongs, and wherein the beacon message further comprises a barcode-reading device identifier that uniquely identifies the barcode-reading device; and
   an intermediary system that is configured to:
      listen for beacon messages;
      receive the beacon message transmitted by the barcode-reading device; and
      forward at least some contents of the beacon message to a remote server based at least in part on detecting the group identifier in the beacon message;
   wherein the barcode-reading device is configured to alternate between a transmission mode during which the barcode-reading device transmits the beacon message and a non-transmission mode during which the barcode-reading device does not transmit the beacon message; and
   wherein the intermediary system is configured to alternate between a data reception mode in which the intermediary system is available to receive data from a connected barcode-reading device and a beacon listening mode in which the intermediary system listens for beacon messages.

2. The system of claim 1, wherein:
   the beacon message comprises a Bluetooth beacon message; and
   the transmission and the reception of the beacon message occurs in accordance with the beacon feature of the Bluetooth protocol.

3. The system of claim 1, wherein the barcode-reading device is unintentionally disconnected from the base station when:
   the barcode-reading device is disconnected from the base station; and
   the barcode-reading device does not initiate the disconnection from the base station.

4. The system of claim 1, wherein forwarding at least some of the contents of the beacon message to the remote server comprises sending a forwarding message to the remote server, and wherein the forwarding message comprises:
   the barcode-reading device identifier;
   an intermediary system identifier that uniquely identifies the intermediary system; and
   an intermediary system location indicator that identifies a location of the intermediary system.

5. The system of claim 4, wherein:
   receiving the beacon message comprises receiving a wireless signal that comprises the beacon message; and
   the forwarding message additionally comprises a signal strength metric that indicates a signal strength of the wireless signal.

6. The system of claim 1, wherein the remote server comprises a management application that is configured to:
   determine barcode-reading device location information based at least in part on the forwarding message;
   generate a user notification message that comprises the barcode-reading device location information; and
   send the user notification message to at least one user device.

7. A system comprising:
   a barcode-reading device configured to transmit a beacon message based at least in part on detecting that the barcode-reading device has been unintentionally disconnected from a base station, wherein the beacon message comprises a group identifier associated with a group to which the barcode-reading device belongs, and wherein the beacon message further comprises a barcode-reading device identifier that uniquely identifies the barcode-reading device; and
   an intermediary system that is configured to listen for beacon messages, receive the beacon message transmitted by the barcode-reading device, and forward at least some contents of the beacon message to a remote server based at least in part on detecting the group identifier in the beacon message;
   wherein the remote server comprises a management application that is configured to:

receive a plurality of forwarding messages corresponding to the beacon message, the plurality of forwarding messages being received from a plurality of intermediary systems;

select an intermediary system from among the plurality of intermediary systems based at least in part on information contained in the plurality of forwarding messages;

determine barcode-reading device location information based at least in part on the plurality of forwarding messages, wherein the barcode-reading device location information comprises a reference to the selected intermediary system;

generate a user notification message that comprises the barcode-reading device location information; and send the user notification message to at least one user device.

8. The system of claim 7, wherein selecting the intermediary system is based at least in part on signal strength metrics included in the plurality of forwarding messages.

9. The system of claim 1, wherein:

the intermediary system comprises a base station that is communicatively coupled to a host computing device;

the base station is configured to receive the beacon message and to send a host notification message to the host computing device based at least in part on receiving the beacon message; and the host notification message comprises the barcode-reading device identifier.

10. A system comprising:

a barcode-reading device configured to transmit a beacon message based at least in part on detecting that the barcode-reading device has been unintentionally disconnected from a base station, wherein the beacon message comprises a group identifier associated with a group to which the barcode-reading device belongs, and wherein the beacon message further comprises a barcode-reading device identifier that uniquely identifies the barcode-reading device; and an intermediary system that is configured to listen for beacon messages, receive the beacon message transmitted by the barcode-reading device, and forward at least some contents of the beacon message to a remote server based at least in part on detecting the group identifier in the beacon message;

wherein the intermediary system comprises a base station that is communicatively coupled to a host computing device;

wherein the base station is configured to receive the beacon message and to send a host notification message to the host computing device based at least in part on receiving the beacon message;

wherein the host notification message comprises the barcode-reading device identifier;

wherein the host notification message further comprises a beacon message indicator; and wherein the beacon message indicator signals to the host computing device that contents of the host notification message originate from a device other than a currently connected barcode-reading device.

11. The system of claim 1, wherein the at least one intermediary system comprises a mobile device comprising an application that is configured to receive and forward beacon messages.

12. The system of claim 1, wherein the system comprises a plurality of intermediary systems, and wherein the remote server comprises a management application that is configured to:

estimate a location of the barcode-reading device based at least in part on a plurality of location indicators and a plurality of signal strength metrics received from the plurality of intermediary systems; and generate a user notification message that comprises the estimated location of the barcode-reading device; and send the user notification message to at least one user device.

13. The system of claim 1, wherein the beacon message additionally comprises supplemental information about the barcode-reading device.

14. The system of claim 13, wherein:

the barcode-reading device comprises a battery; and the supplemental information comprises a battery status indicator.

15. The system of claim 1, wherein the barcode-reading device is additionally configured to:

set a timer in response to detecting that the barcode-reading device has been unintentionally disconnected from the base station; and begin transmitting the beacon message when the timer expires.

16. The system of claim 1, wherein:

the barcode-reading device is configured to periodically transmit the beacon message; and the intermediary system is configured to periodically listen for beacon messages.

17. The system of claim 1, wherein the transmission of the beacon message by the barcode-reading device occurs asynchronously with respect to the receiving of the beacon message by the intermediary system.

18. The system of claim 1, wherein:

transmission intervals are time periods when the barcode-reading device is in the transmission mode;

beacon listening intervals are time periods when the intermediary system is in the beacon listening mode; and the transmission intervals of the barcode-reading device are not synchronized with the beacon listening intervals of the intermediary system.

19. The system of claim 18, wherein:

the transmission intervals each have a transmission interval duration;

the beacon listening intervals each have a beacon listening interval duration; and the transmission interval duration is greater than the beacon listening interval duration.

20. The system of claim 7, wherein the barcode-reading device is unintentionally disconnected from the base station when:

the barcode-reading device is disconnected from the base station; and the barcode-reading device does not initiate the disconnection from the base station.

* * * * *